US011151380B2

(12) United States Patent
Alexander

(10) Patent No.: US 11,151,380 B2
(45) Date of Patent: Oct. 19, 2021

(54) AUGMENTED REALITY RISK VULNERABILITY ANALYSIS

(71) Applicant: International Business Machines Corporation, Armonk, NY (US)

(72) Inventor: John S. Alexander, Hampstead, NC (US)

(73) Assignee: International Business Machines Corporation, Armonk, NY (US)

(*) Notice: Subject to any disclaimer, the term of this patent is extended or adjusted under 35 U.S.C. 154(b) by 144 days.

(21) Appl. No.: 16/262,147

(22) Filed: Jan. 30, 2019

(65) Prior Publication Data

US 2020/0242360 A1    Jul. 30, 2020

(51) Int. Cl.
| | |
|---|---|
| G06K 9/00 | (2006.01) |
| G06N 20/00 | (2019.01) |
| G06K 9/66 | (2006.01) |
| G06T 19/00 | (2011.01) |
| G08B 6/00 | (2006.01) |
| G08B 21/02 | (2006.01) |
| G06K 9/62 | (2006.01) |

(52) U.S. Cl.
CPC ........... *G06K 9/00671* (2013.01); *G06K 9/66* (2013.01); *G06N 20/00* (2019.01); *G06T 19/006* (2013.01); *G08B 6/00* (2013.01); *G08B 21/02* (2013.01); *G06K 9/6256* (2013.01); *G06K 9/6268* (2013.01)

(58) Field of Classification Search
CPC ............. G06K 9/00671; G06K 9/6256; G06K 9/6268; G06K 9/66; G06N 20/00; G06T 19/006; G08B 21/02; G08B 6/00
See application file for complete search history.

(56) References Cited

U.S. PATENT DOCUMENTS

| | | | |
|---|---|---|---|
| 7,134,008 B2 | 11/2006 | Dutt et al. | |
| 7,134,088 B2 | 11/2006 | Larsen | |
| 7,194,395 B2 | 3/2007 | Genovese | |
| (Continued) | | | |

OTHER PUBLICATIONS

Kaiser Permanente, "Hazard and Vulnerability Assessment Tool Human Related Events" Kaiser Permanente, https://www.calhospitalprepare.org/post/hazard-vulnerability-analysis-tool, 2014, last downloaded Aug. 6, 2018, 1 page.

*Primary Examiner* — Tom Y Lu
(74) *Attorney, Agent, or Firm* — Scully, Scott, Murphy & Presser, P.C.; Brian Restauro, Esq.

(57) ABSTRACT

A system, method and program product for identifying a risk hazard vulnerability at a target environment and presenting a detected risk hazard. The method configures an evaluator mobile computing device to obtain, via the mobile device, a real-world view or image data of items/objects in a target real-world environment and, optionally, or in addition, obtain other context data associated with the target environment. The method invokes operations of a risk vulnerability model to detect a risk associated with the target object within the real-world view and based on any additional associated context data. The method causes the mobile device to further generate a visual, audible or haptics indication of the identified risk vulnerability and/or a calculated risk score of the target object for display on the mobile computing device and display the risk vulnerability indication on the real-world view displayed at the mobile device.

17 Claims, 7 Drawing Sheets

(56) References Cited

U.S. PATENT DOCUMENTS

| | | |
|---|---|---|
| 7,280,038 B2 | 10/2007 | Robinson |
| 7,596,608 B2 | 9/2009 | Alexander et al. |
| 8,738,754 B2 | 5/2014 | Windell |
| 8,830,267 B2 | 9/2014 | Brackney |
| 9,112,896 B2 | 8/2015 | Basavapatna et al. |
| 9,317,692 B2 | 4/2016 | Elder et al. |
| 9,934,384 B2 | 4/2018 | Johansson et al. |
| 9,945,228 B2 | 4/2018 | Mancini |
| 9,945,981 B2 | 4/2018 | Eickelman et al. |
| 9,965,564 B2 | 5/2018 | Whelihan |
| 10,579,749 B1* | 3/2020 | Davis .................. G06F 30/20 |
| 2009/0273479 A1* | 11/2009 | Waugh .................. G08B 21/12 |
| | | 340/584 |
| 2014/0132409 A1* | 5/2014 | Billman .................. G08B 31/00 |
| | | 340/539.1 |
| 2015/0030203 A1* | 1/2015 | Kim .................. G06K 9/00624 |
| | | 382/103 |
| 2015/0325047 A1 | 11/2015 | Conner et al. |
| 2016/0140868 A1 | 5/2016 | Lovett et al. |
| 2016/0343163 A1 | 11/2016 | Venkatesha et al. |
| 2017/0089710 A1 | 3/2017 | Slusar |
| 2017/0322119 A1 | 11/2017 | Da Silva et al. |
| 2018/0089870 A1 | 3/2018 | Billi-Duran et al. |
| 2018/0259338 A1* | 9/2018 | Stokes .................. G01C 21/203 |
| 2019/0236844 A1* | 8/2019 | Balasian .................. G06T 11/60 |
| 2019/0318165 A1* | 10/2019 | Shah .................. G06F 3/0482 |
| 2020/0175767 A1* | 6/2020 | Stivi .................. G08B 25/14 |

\* cited by examiner

AUGMENTED REALITY RISK VULNERABILITY ANALYSIS

FIELD

Embodiments of the present invention generally relate to a computer-implemented system and method for assessing vulnerabilities and determining risk hazards, and particularly, a mobile device system and method for determining potential risk hazards at a location and generating, in real-time, content such as a highlight of a risk vulnerability item/object on a real-world display at a user's mobile device to inform a user of a hazard vulnerability.

BACKGROUND

Previously in order to perform a hazard vulnerability analysis, an expert in the field would have to collect relevant hazard and preparedness information from various sources, then apply that information in a Hazard Vulnerability Analysis, which typically takes the form of a spreadsheet (e.g. a Kaiser Permanente Excel worksheet) or web application (e.g., LiveProcess.com). The analysis would then be used to inform decisions and actions in how to prepare for, mitigate, and train for, indicated vulnerabilities. This process typically takes hours, days or weeks to collect relevant information to complete the analysis, whereupon the results are communicated and action then taken.

SUMMARY

A system, method and computer program product is provided for a mobile phone apparatus or like mobile device to perform a hazard vulnerability analysis in real-time while increasing the speed in which responsive action may be taken, and the improving quality of the vulnerability assessment.

A system, methods and computer program products configuring a mobile phone or like mobile device to automatically identify, in real-time, a risk or hazard in a current target environment based on images taken at and/or additional context data associated with the location, and configuring the mobile device to present the identified hazard to a user via a mobile device interface.

The system and method provides logic for generating and configuring an audio output, video/display output, image output to present the identified hazard vulnerability and/or provide haptic feedback or tactile sensation to a human interacting with the mobile phone or like mobile device to present the identified hazard vulnerability via a haptic interface.

In one embodiment, there is provided a method comprising: obtaining, using an image sensor associated with a mobile computing device, a real-world view of a target real-world environment; detecting, in real-time, using a processor at the mobile computing device, a target object within the real-world view; obtaining, in real-time, using the processor, additional context data associated with the target object; detecting, using the processor, a risk hazard associated with the target object based on the context data and the target object; generating, using the processor, an indication of the risk vulnerability of the target object for display on the mobile computing device; and displaying, using the processor, the risk vulnerability indication on the real-world view displayed at the mobile computing device.

According to another aspect of the present invention, there is provided a computer-implemented system. The system includes: an image sensor associated with a mobile computing device; a memory storage device storing program instructions; and a hardware processor coupled to the memory storage device and configured to run the program instructions to perform a method to: obtain, using the image sensor, a real-world view of a target real-world environment; detect, in real-time, at the mobile computing device, a target object within the real-world view; obtain, in real-time, additional context data associated with the target object; detect a risk hazard associated with the target object based on the context data and the target object; generate an indication of the risk vulnerability of the target object for display on the mobile computing device; display the risk vulnerability indication on the real-world view displayed at the mobile computing device.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1A:
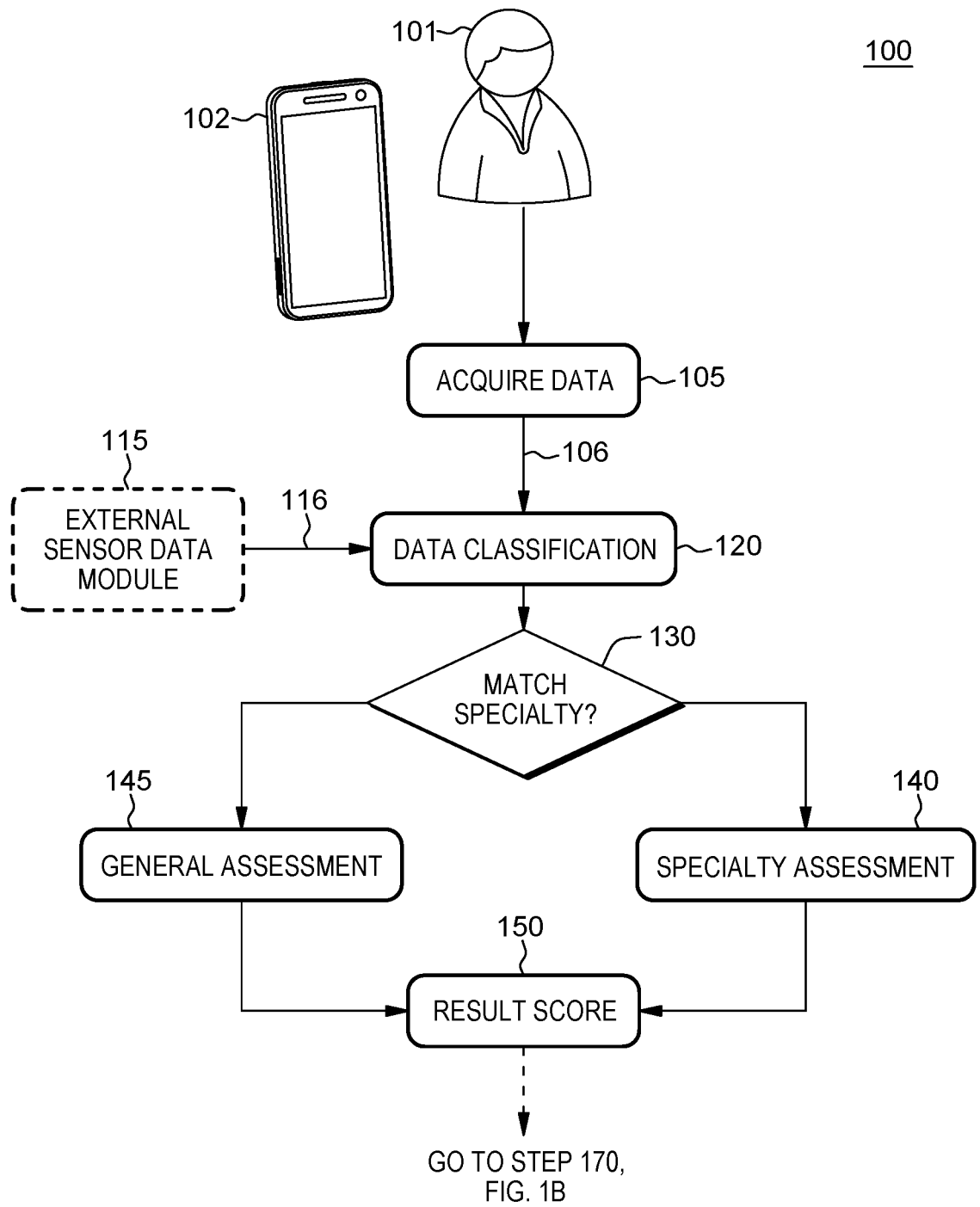
FIG. 1A and FIG. 1B depict high level flow chart of a method according to which the principles of the present invention are employed.

Current risk vulnerability analysis processes typically takes a human expert in the field hours, days or weeks to collect relevant information to complete a hazard analysis and generate (score, document and take action).

The system, method and computer program products herein perform this risk vulnerability analysis process in real-time, increasing the speed in which action may be taken, and the quality of the vulnerability assessment. The user of the risk vulnerability analysis system and methods has augmented expertise in the field in question, allowing more frequent hazard analysis due to not needing an expert physically present. The system, method and computer program products herein further allows multiple users of the system, all acting as inputs to determine risk. This "augmenter/multiplier" of expertise is a factor that increases the quality and confidence level of any assessment and effectively allows for fast and accurate hazard assessments.

FIG. 1 conceptually depicts a system 100 implementing methods and computer program products to configure a mobile phone or like mobile device 102 to automatically conduct a vulnerability assessment of a target environment/location and increase the quality of the vulnerability assessment in the mobile phone apparatus or like mobile computing device. The system and methods embodied as program instructions automatically provide for a user 101 of the mobile device 100 to acquire, at 105, images and/or video and or audio/audio patterns emanating from an object or item at a current target location and use the acquired image/audio data 106 of the target to identify a risk or hazard in the current target context or location.

In an embodiment, at 106, the mobile device 102 collects information for input to the system from its sensors such as: camera, microphone, cellular radio, Global Positioning System (GPS) radio, gyroscope, thermometer, barometric sensor, or touch screen. The mobile device also captures an image, audio, and video stream on which to superimpose risk hazard vulnerability assessment results, e.g., in the form of augmented reality information. Data 116 is also collected from one or more existing systems 115, which may consist of, but not limited to: remote sensing data, data obtained from Internet-of-Things (I-o-T) devices at or proximate the current target location, social media streams, geospatial systems, current or historical weather data, news streams, blueprints, hardware or engineering documentation. Such data 116 can correspond to a current state or context of the target location which may impact (e.g., increase) a potential risk or hazard. This data 116 may be collected by the mobile device, or collected and transmitted to an external system for processing. Combined sensor data, and image, audio and video data are sent to a data classification unit at 120 which may occur locally on the mobile device or on an external server.

Continuing to 120, data classification unit invokes machine learning and heuristic techniques for classifying the data into specialty categories, or a default general category if no match can be made. For example, a specialty category may be a risk vulnerability associated with an item at the location, e.g., a status of an oxygen gas canister at a hospital, or a sufficiency of an amount of fire extinguishers at the target location. For example, if a match is made into a specialty category of classification, further category specific assessment is made. For example, if a healthcare gas system is recognized in incoming data, it may further be analyzed with machine learning and heuristic systems specific to that domain in order to establish risk. For example, after recognizing a system as healthcare/gas system, the specialized healthcare/gas sub-system can then check to see if any anomalies are detected in the input stream increasing risk, or establish that no anomalies are detected.

Continuing to 130, a further step involves determining whether a classified object matches a specialty category. If the processing step does determine that the classified object matches a specialty category, the item/object may be further analyzed further a category specific analysis at 140. Otherwise, if it is determined that the classified object does not match a specialty category, the item/object may be evaluated for a general risk vulnerability assessment, e.g., a "catch-all" assessment at 145, e.g., looking for smoke or excessive noise. For example, using supervised machine learning and heuristic techniques data input is transformed into an overall vulnerability score for the data, plus other relevant data such as spatial dimensions or status. Vulnerability may be calculated by any means, providing the result is a normalized value suitable for further processing by the system. One exemplary way for vulnerability calculation is as follows:

$$\text{Risk} = \text{Probability} * (\text{Magnitude} - \text{Mitigation}),$$

however the system may use any means of risk calculation.

As shown in FIG. 1, the result of either general assessment processing at 145 or specialty assessment processing at 140 is a risk vulnerability score 150, along with any other data considered relevant for display such as dimensions for a physical object such as a gas canister or roadway, a last inspected date for something like a fire suppression system, or a status for a machine, such as a locking mechanism.

Whether processed locally at the device or externally at a server, based on the acquired image data 106 of the target and the sensor data 116, and the general risk assessment or specialty risk assessment scores 150, logic can identify a risk, and responsively configure the mobile device 102 to immediately present the identified risk hazard to a user via a user interface.

Figure 1B:
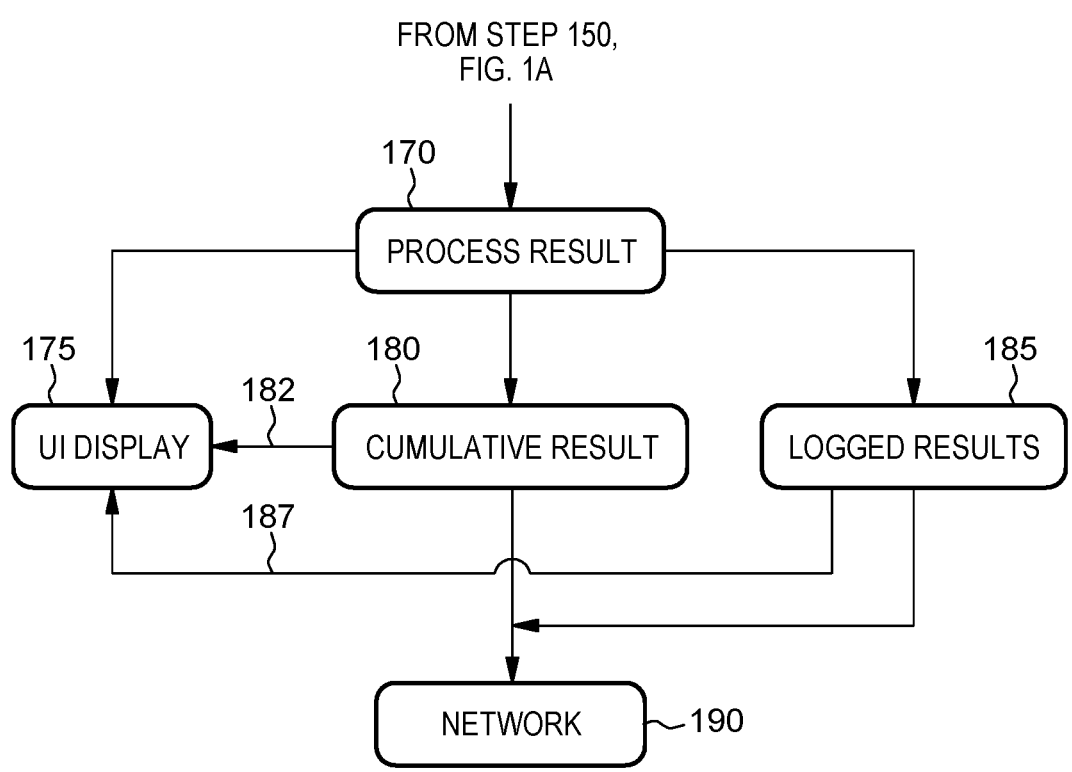

Continuing to FIG. 1B, after obtaining result 150 in FIG. 1A, the result is processed according to any one or more of three processing branches including: a first branch for generating an user interface (UI) display at 175 at the mobile device 102; a second branch for obtaining a cumulative result 180 based on the similar risk assessment data received; and a third branch for obtaining a logged cumulative result 185 based on the similar risk assessment data received.

In an embodiment, with respect to the generating and presenting of the risk vulnerability assessment on a user interface at 175, data produced as the risk vulnerability result, is superimposed on the user interface display, audio or haptics of the mobile device, indicating at least some of: the object(s) recognized, the risk score for that object, a cumulative or running result assessment, 182 or a history of logged risk results 187. In an embodiment, the logged results or cumulative results output of the processing 170 may be additionally output to another device, e.g., server or database, via a network connection 190, using a common HTTP/S secure link, Bluetooth, or other network device that functions as an additional output for resulting risk analysis. This network can consist of static servers, mobile devices, or IoT devices. Network 190 may further facilitate a second person or evaluator real-time access items found by the evaluator conducting a risk-vulnerability analysis.

In one embodiment, the interface at the mobile device 102 is an augmented reality (AR) or extended reality (XR) interface at the mobile device 102. The mobile device 102 will indicate, in real-time, any identified hazard vulnerability to the user 101 using AV, e.g., a display showing a highlighted item or object of the assessed risk hazard, or indicate the risk hazard and/or risk hazard score via an audio or video display interface. Alternatively, or in addition, the identified hazard vulnerability is presented as a tactile sensation to the user 101 interacting with mobile device 102 to present the identified hazard vulnerability, e.g., via a haptic interface.

In an embodiment, with respect to the generating and presenting of the cumulative risk vulnerability assessment results on a user interface at 180, a running total of risk is measured, which can be displayed to the UI at device 102, or transmitted to the network server for additional distribution, communication, or further assessment.

In an embodiment, with respect to the generating and presenting of the logged risk vulnerability assessment results on a user interface at 185, the system logs all risk assessment results locally for historical record. These logged results may be displayed on the device UI, audio, or haptics, or transmitted to the network.

Figure 2:
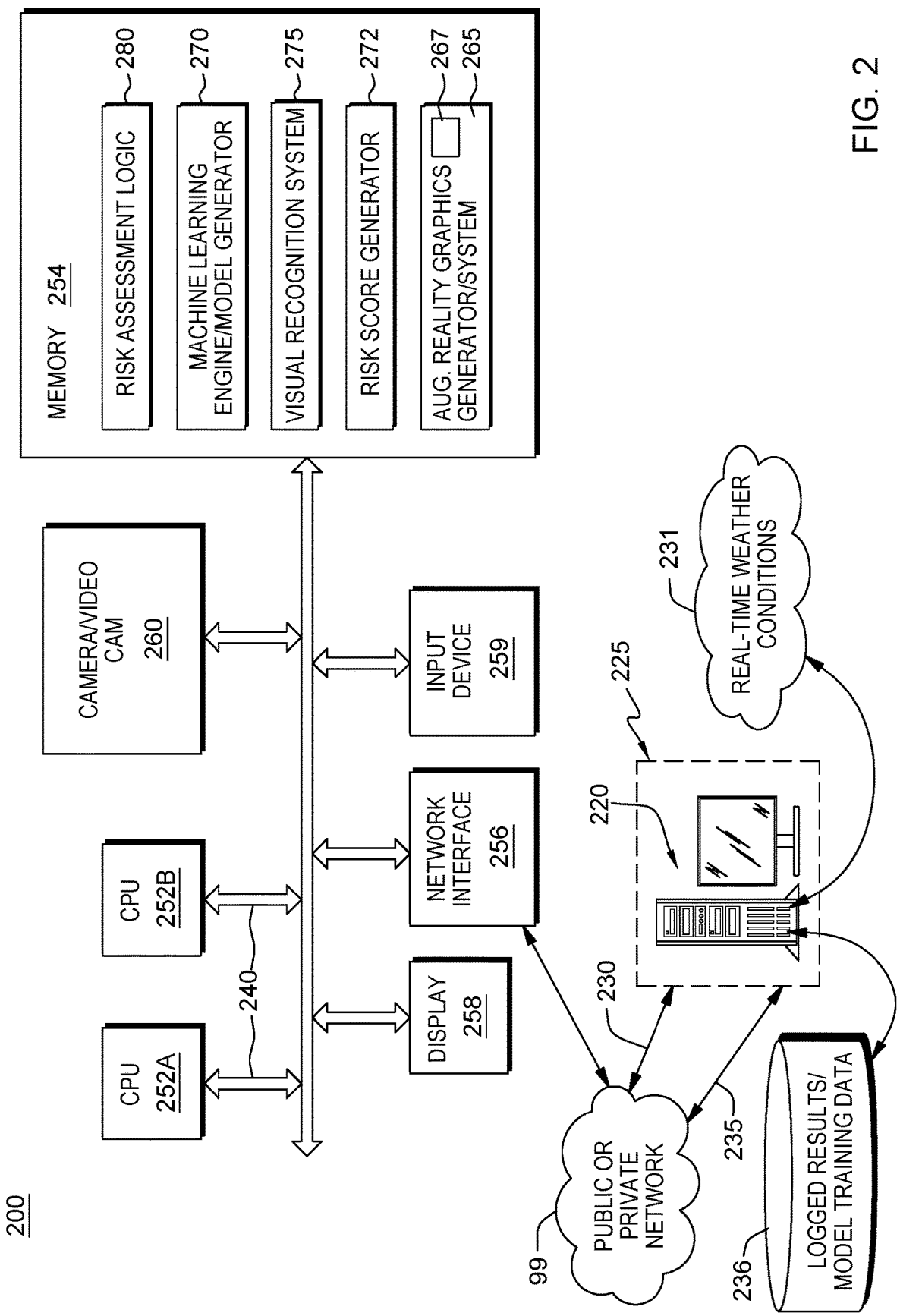
FIG. 2 depicts a mobile device system providing the ability for risk vulnerability analysis according to one embodiment.

Referring now to FIG. 2, there is depicted a block diagram of a mobile computing device 200 providing an ability to conduct risk vulnerability analysis and modify the mobile device environment from a "real" reality to an augmented reality (AR) to present a risk vulnerability to a user. In some aspects, device 200 is a mobile device, e.g., smart device, smart phone, tablet, etc., however, in some aspects, computing device 200 may include, for example, personal computers, laptops, or any other similar computing device.

Computing system 200 includes one or more hardware processors 252A, 252B, a memory 254, e.g., for storing an operating system and application program instructions, a network interface 256, a display device 258, an input device 259, and a camera/video recorder or other like imaging device 260 that can take a real-world view, i.e., pictures or video stream, at a target environment for use in risk vulnerability assessment. In some aspects, computing system 200 may, for example, be any mobile computing device that is configured to communicate with a web-site 225 or web- or cloud-based server 220 over a public or private communications network 99.

Further, as shown as part of system 200, historical data sets including training data (e.g., images of risk vulnerable items with or without sensor data) and/or logged results data that captures potential risk hazards at target locations that can stored locally in an attached memory storage device, or stored in an attached, or a remote memory storage device 236, e.g., a database associated with server 220, and accessed via a remote network connection for input to the system 200.

In the embodiment depicted in FIG. 2, processors 252A, 252B may include, for example, a microcontroller, Field Programmable Gate Array (FPGA), or any other processor that is configured to perform various operations. Processors 252A, 252B may be configured to execute instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 254 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows mobile computing device 200 to transmit information to or receive information from the server 220.

In an embodiment, network interface 256 of mobile computing system 200 is shown interfacing with the computer hosted web-site 225 including the server 220 in operative communication with a public networked system 231 (such as the National Weather Service) or like weather service portal that provides a current RSS (Really Simple Syndication) or current XML data feed 230 of current real-time monitored weather conditions at a target location where a risk vulnerability is to be assessed.

Display 258 may include, for example, a computer monitor, television, smart television, a display screen integrated into a personal computing device such as, for example, laptops, smart phones, smart watches, augmented reality/virtual reality headsets, smart wearable devices, haptic devices, or any other mechanism for providing results information to a user. In some aspects, display 258 may include a liquid crystal display (LCD), an e-paper/e-ink display, an organic LED (OLED) display, or other similar display technologies. In some aspects, display 258 may be touch-sensitive and may also function as an input device.

The device 200 may include a haptic interface (not shown) that provides a 'haptic feedback', e.g., a touch feedback to the end user or any tactile sensation applied to human interaction involving physical contact with the device 200.

Input device 259 may include, for example, a keyboard, a mouse, a touch-sensitive display, a keypad, a microphone, or other similar input devices or any other input devices that may be used alone or together to provide a user with the capability to interact with the mobile computing device 200.

With respect to the ability of computer system 200 for running a hazard vulnerability identification system, mobile device 200 is equipped with a memory 254 storing processing modules that include programmed instructions adapted to invoke operations for risk hazard vulnerability assessment.

A first processing module includes a machine learning engine 270 having programmed instructions that when run, e.g., by a processor 252A, is adapted to invoke operations for recognizing captured real-world view (visual or audio data) of a target object(s)/item(s) taken by a user at a target location. Machine learning engine 270 is configured to invoke a visual recognition system 275 for obtaining and recognizing objects/items in the real-world view taken by the mobile device based upon pre-determined risk categories associated with a particular environment. Machine learning engine 270 is further configured to invoke risk assessment logic 280 is employed to evaluate captured real-world image or video/audio data, and classify the objects/items captured in the image or video/audio data according to a defined specialty risk assessment category or a defined general risk assessment category. The machine learning engine 270 can then be employed to detect any associated potential risk vulnerability at a particular location/facility in real-time at the target location being assessed.

In one embodiment, as further shown in FIG. 2, one of the programmed processing modules stored at the associated server memory 254 include a risk score generator 272 that when run by a processor at device 200 or run externally, configures the system to invoke operations for continually aggregating the computed risk assessment result scores and providing the user with a continuously updated digital summary via a user interface. For a particular risk vulnerability assessment application, the risk score data is continuously accumulated and/or logged for storage and/or presentation.

As further shown in FIG. 2, one of the programmed processing modules stored at the associated server memory 254 include a augmented reality graphics generator/system 265 that, when run by a processor at device 200 or run externally, configures the system to generate an AR display as an overlay on the current real-world view display on the device. In an embodiment, the risk assessed items are caused to be displayed via a generated AR display. For example, a particular object/item that has a generated risk score currently assessed as providing a risk vulnerability hazard can be highlighted within the real-world view using augmented reality graphics generator/system 265.

In an embodiment, device 200 provides invokes a haptic module 267 for configuring the device 200 to generate and present or provide the identified hazard vulnerability result(s) as haptic feedback or as a tactile sensation, e.g., a vibration, to a human interacting with the mobile phone or like mobile device to present the identified hazard vulnerability and/or score data, e.g., via a haptics interface.

As an example: a target location may be a hospital room setting or facility, and captured visual or audio data of a target object/item taken by a user using device 200 at the target location may be a gas canister, e.g., oxygen gas canister or fire extinguisher. The image capture of the oxygen gas canister can indicate an expiration date which information can be identified/extracted and then correlated to relevant data that would indicate to a user that a risk vulnerability exists with respect to the oxygen gas canister. For example, the image captured of the oxygen gas canister, when subject to a risk vulnerability analysis, can reveal text such as a next inspection date which, if prior to a current date, can indicate a risk vulnerability. A respective risk vulnerability score associated with this type of risk vulnerability can be generated.

In an embodiment, an expert user is tasked beforehand to identify potential vulnerabilities obtain images and use supervised machine learning module 270 to train a model to learn potential risk vulnerability a target location/facility. For a target location including a hospital room setting or a bank, an example identified risk vulnerability or potential risk hazard may include those in categories such as a fire, a power outage, and armed gunman. In an embodiment, with respect to the fire risk category, any user, e.g., a risk coordinator at a hospital setting, can walk through and identify fire extinguishers, and can take images of any expiration and/or inspection dates associated with the extinguisher, canister or gas tank. The text such as dates in any of the acquired images can be compared to a current date to ascertain if the canister presents a risk hazard as being past an inspection/expiration date. Similarly, if at a bank or a casino, images can be taken of overhead camera devices to ensure they are all on and oriented correctly.

Figure 3:
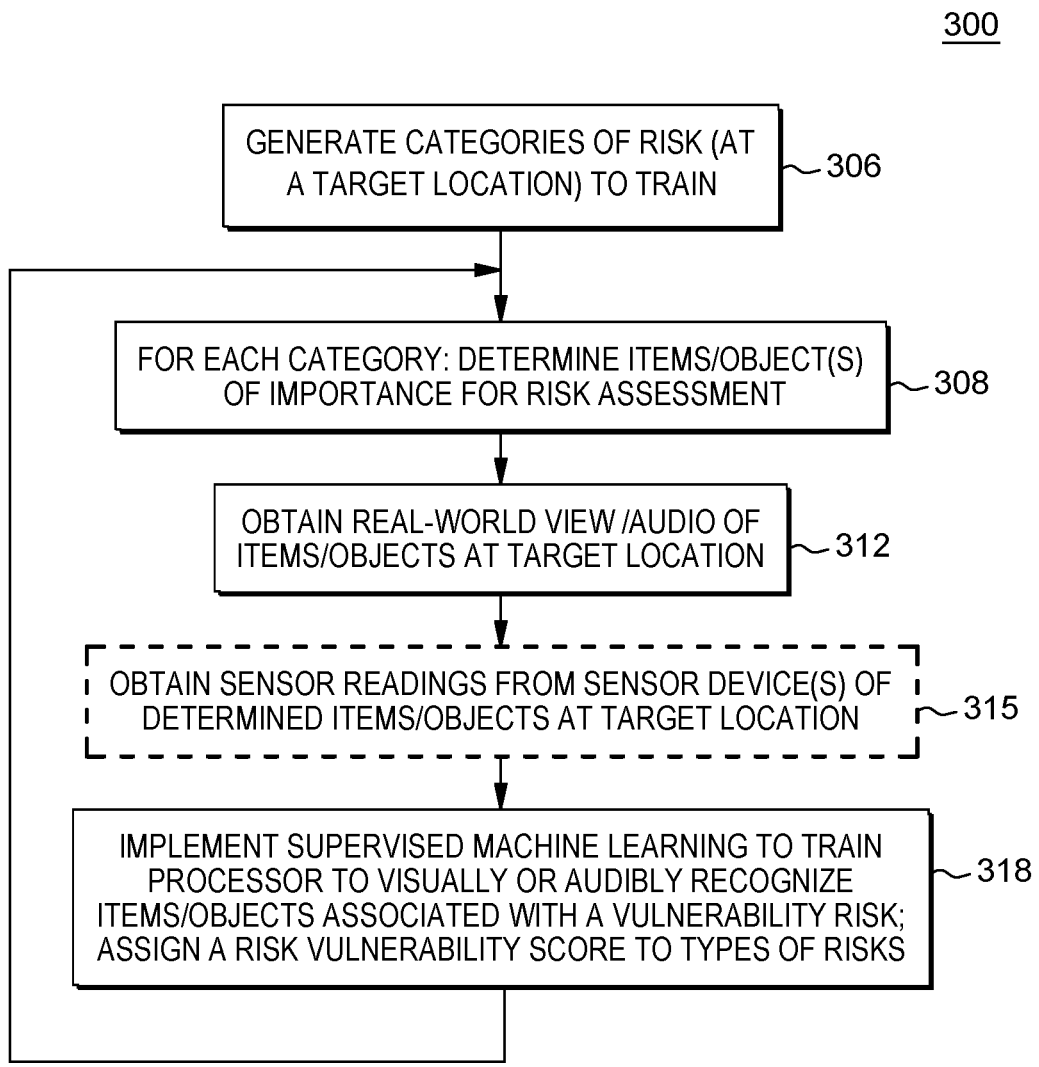
FIG. 3 depicts an exemplary method run at the mobile device and associated computer system for training a risk vulnerability model to perform risk vulnerability analysis operations according to one embodiment.

FIG. 3 depicts a method 300 invoking machine learning and visual recognition modules 270, 275 for generating a machine learned risk vulnerability detection model for use in determining a risk hazard vulnerability at a target location or facility. In an embodiment, a risk hazard visual recognition system runs a model that is trained to recognize, from a real-world view of a target location, any objects/items associated with known categories of risk hazards.

Initially, at 306, FIG. 3, a user or an expert specifies a risk category/categories for a target location or target environment, e.g., a hospital or a bank. Examples of a risk category for such target locations may include, but is not limited to: fire, power outage, armed gunmen, etc. At 308, FIG. 3, within each specified risk category, the user or expert specifies certain items/objects or audio patterns (e.g., sounds of objects) at the target environment such as a hospital or a bank that may contribute to a risk hazard category.

At 308, a specification is made, for each risk category for which the risk hazard vulnerability detection model is trained, of the items/object(s) of importance for risk assessment. In an embodiment, the existence or non-existence of certain objects, e.g., a fire extinguisher can be a potential risk hazard. Alternatively or in addition, a data, e.g., text such as type: date, associated with the object can be used in the risk assessment for that category. For the example aforementioned risk category of a fire at a hospital or like facility, the determined items/object(s) of importance for risk assessment may include, but are not limited to: the amount of good gas canisters or fire extinguishers, the inspection status of gas canister/tank objects, the state of the means used to secure the gas canister/tank at the facility, a state of smoke detectors, and those objects' associated data information such as last inspection/expiration or battery replacement date.

As a further example, a number of good gas canister/tank objects may be also determined as a potential risk vulnerability. For example, it may be prior determined by an expert that 11 good functioning extinguishers out of 12 extinguishers at a target environment is a success number such that no risk vulnerability is presented. Thus, if it is determined that only 10 out of 12 canisters are good and two is damaged or expired, this will still present a risk hazard/vulnerability at the target location and a corresponding risk vulnerability score would be associated with this type of risk. Alternatively, or in addition, the expert may further specify or establish any success requirements/or criteria would be for a risk vulnerability breach, e.g., fire extinguishers are important and 20 out of 20 has to be classified as secured and not damaged and meeting current inspection. The expert may further specify or establish any success requirements/or criteria that would be for a risk vulnerability breach, e.g., a date of a gas canister's last inspection+"X" amount of days, e.g., X=30 days, which may be determined is acceptable, or a criteria for success such as a current date minus one year which is an instruction indicating a good canister if the last inspection shown in the image is within that time range.

At 312, FIG. 3 the system 300 captures real-world view (e.g., a visual display or audio pattern data) of determined objects/items of importance for risk assessment according to the risk category at the target environment. Optionally, or in addition, at 315, the system can obtain additional data from other sensor device(s) of determined items/objects that provides additional context associated with a particular vulnerability risk at the target location. For example, a data feed indicating a real-time weather condition at the target location can be received and, dependent upon the weather condition, e.g., a hurricane/storm, can be correlated as contributing to an increase in a risk vulnerability such as a power outage or a fire. It is understood that, any collection of information and/or use of data at any target location/environment is permissive, e.g., any proprietary images/data collected that is used in the risk vulnerability analysis (e.g., historical data, data from certain I-O-T devices, data feeds, etc.) is done so with permissions obtained in advance from the data owners who are notified of such collection. In an embodiment, there is implemented an opt-in and opt-out feature as a basis of permission for the obtaining/collecting data from such sources in compliance with any processes using confidential/sensitive material. Then, at 318, the system implements supervised machine learning engine 270 to train the risk vulnerability model at the mobile computing device to visually recognize items/objects in a real-world view associated with vulnerability risk and/or audibly recognize audio patterns associated with items known to present a risk hazard both with and without the additional context information from the other sensors or data feed.

As part of this training, in an embodiment, at 318, the risk vulnerability model is trained to recognize the pre-determined objects/items of importance for general risk assessment according to the risk category and correlate a recognized object/item to pre-stored images of those corresponding objects/items known to be functioning correctly, and/or correlate recognized object/items of importance for risk assessment to pre-stored images of those corresponding objects/items having a known dysfunction. For example, in the case of training a risk vulnerability detection model on images of a potential gas canister risk vulnerability in a hospital setting, there can be used pre-stored images of a disfunctioning gas canister or container, or an item having a specific broken or missing element, such as a broken trigger or missing knob on a fire extinguisher object/item. A risk vulnerability score or value for use in risk assessment is associated with this type of risk.

As another example, an acquired image taken at 312 showing a poorly secured canister, e.g., a broken or missing bracket that poorly secures the canister to a wall, can present a risk hazard and the machine learning module can use images of poorly secured canister containers to train the risk vulnerability model 275 to recognize a potential risk hazard (e.g., the gas canister or fire extinguisher needs to be better secured to a wall) at the target location being assessed for risk hazards. A risk vulnerability score or value for use in risk assessment is associated with this type of risk.

In an embodiment, the risk vulnerability model is further trained to visually and/or audibly recognize pre-determined objects/items of importance for a specialty risk assessment according to the risk category. For example, risk vulnerability model can, upon recognizing a match of an object/item, can invoke visual recognition system to further focus to obtain and extract any type of data or indicia associated with or located on the object/item. For example, in a specialty risk assessment supervised learning is used to train the model to correlate text or data of a particular type from the image of the object, e.g., a date, or catalogue number or bar code number. For example, the model is trained to find text in the obtained image, e.g., a 15 digit number with a hyphen at a specific location, or a date such as a next inspection date on a canister or a hand-written number. The model is trained to compare the number, code or date in the obtained image against a particular data, e.g., data representing a correct 15 digit number, the current date or a correct code, stored at a known memory storage location of the mobile device or a remote server. In this manner, the model can determine whether there is a risk vulnerability presented, e.g., the gas canister at the hospital is due for a next inspection based on the current date.

Further, an example of a specialty risk assessment according to the risk category risk vulnerability model is trained using supervised learning to correlate types of data produced from other sensors on the mobile device or received as data stream feeds (e.g., current weather condition or historical weather conditions, fire department information providing data representing the current inspection dates of the target objects, location data obtained by the GPS on the mobile device, or even a Twitter® sentiment from a Twitter input feed for the target location, e.g., hospital, which sentiment may alert to a social unrest).

As part of the model training, at 318, FIG. 3, a risk vulnerability score is assigned to indicate a degree of potential risk that can be associated with a risk type to be assessed at a target environment. That is, based on a type of risk hazard, e.g., a missing fire extinguisher out of a predetermined number, a missing fire extinguisher trigger, a type date showing an expired or uninspected extinguisher, a deviation from a successful number extinguishers at a location, or a deviation of an expected audio pattern from a particular object/item, there can be an associated risk score assigned.

The model training process is a continuous process and the steps 308 to 318 are subsequently repeated for each risk vulnerability/hazard category. Once the model is generated, it is subsequently used by any user conducting a real-time risk vulnerability assessment at a target location.

In an embodiment, an expert used to train the system does not actually need to be present. The fact that an expert does not need to be present implies that a user can use the system and methods in places where distance or geography would prevent risk analysis examination, e.g., in a deep sea drilling installation, in a mountain, etc.

Figure 4:
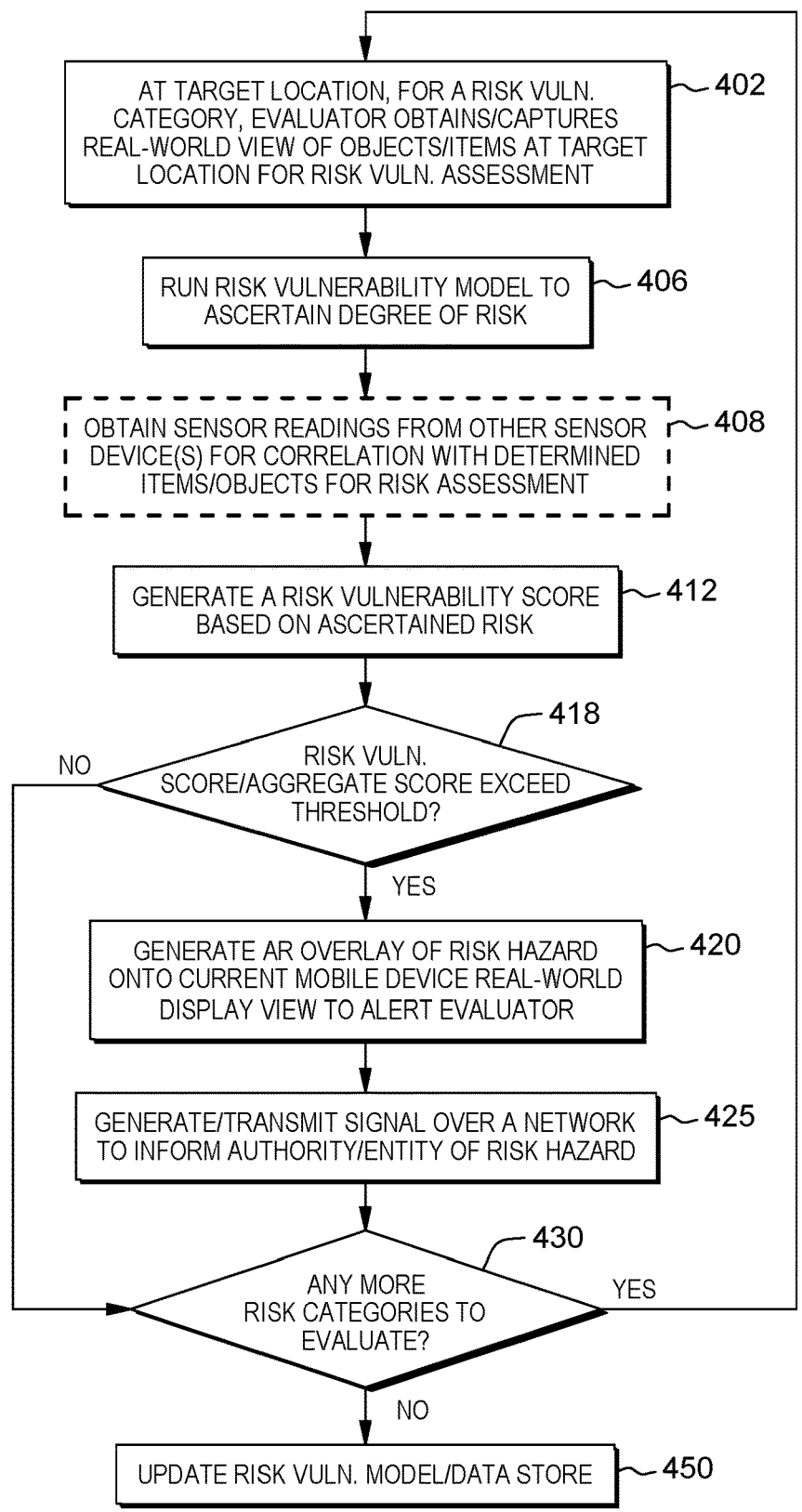
FIG. 4 depicts an exemplary method run at the mobile device and associated computer system for performing a risk vulnerability analysis using the mobile device and trained risk vulnerability model.

FIG. 4 shows a method 400 implemented by a user/evaluator using A/R glasses or a mobile phone device running an application that runs the trained risk vulnerability assessment model for performing a real-time risk vulnerability assessment at a target location, e.g., hospital, according to an embodiment. At 402, FIG. 4, an application running at the mobile device may first provide instructions, via a user interface, for the user to use the mobile device to invoke operations to focus and obtain/capture a current real-world display view or certain images of certain items/objects associated with risk categories determined for the target location/environment. The device's visual recognition system is invoked to visually and/or audibly recognize from the real-time real-world view particular items for general and specialty risk assessment. The risk vulnerability assessment model 270 is then invoked (locally at the device or remotely such as at a remote server) at 406 to detect existence of any risk hazard or vulnerability for the risk category. The model is trained to correlate an obtained image and a specific item(s) in the image against the images of known, correctly functioning and/or disfunctioning items.

For example, the risk vulnerability model is invoked to correlate obtained audio/images of determined items/objects at target location to known audio/images of items indicating a risk potential.

At 408, the model is optionally invoked to perform further operations to obtain a current data from a local sensor, e.g., an I-o-T device at the target location that senses an object not accessible in the view of an evaluator but providing sensor data that is to be coupled with the visual view of an object in risk evaluation, e.g., temperature sensor, is obtained for risk evaluation. Data from a current data feed, e.g., a social media "sentiment" determination, a real-time or historical weather condition, may also be received for use in assessing a risk vulnerability of a particular item. The risk vulnerability model is then further invoked to correlate obtained audio/images of determined items/objects to data produced by such other sensors or data to indicate a risk potential associated with the item/object.

In an embodiment, at 412, FIG. 4, each identified general and/or specialty risk item is assessed and assigned a risk score based on the risk vulnerability assessments conducted using the trained model. As an example, the model can generate a risk vulnerability score according to a Kaiser Permanente Hazard Vulnerability Analysis (HVA) that computes a risk score based on probability of risk occurrence and a severity or magnitude of the risk, i.e., Risk=Probability*Severity For example, a risk probability may be a percentage value that a risk vulnerability or threat event may occur, and a severity score may be a value between 0 and 3 for example with 0 meaning no severity and 3 being a high magnitude. A severity value can be based on a magnitude (e.g., physical losses and damages, interruption of services, etc.) and any mitigation factors (e.g., internal/external response effectiveness, preparedness, time, resources, supplies, etc.) according to:

Severity=Magnitude−Mitigation

As an example, for the example risk vulnerability assessment for a hospital, the Kaiser Permanente hazard and vulnerability assessment tool may compute a risk score (probability*severity) of the following risk categories/events: Active Shooter, Acts of Intent, Bomb Threat, Building Move, Chemical Exposure, External, Civil Unrest, Communication/TelephonyFailure, Dam Failure, Drought, Earthquake, Epidemic, Evacuation, Explosion, External Flood, Fire, Flood, Forensic Admission, Gas/Emissions Leak, Generator Failure, Hazmat Incident, Hazmat Incident with Mass Casualties, Hostage Situation, Hurricane, HVAC Failure, Inclement Weather, Infectious Disease Outbreak, Internal Fire, Internal Flood, IT System Outage, Landslide, Large Internal Spill, Mass Casualty Incident, Natural Gas Disruption, Natural Gas Failure, Other, Other Utility Failure, Pandemic, Patient Surge, Picketing, Planned Power Outages, Power Outage, Radiation Exposure, Seasonal Influenza, Sewer Failure, Shelter in Place, Strikes/Labor Action/Work Stoppage, Suicide, Supply Chain Shortage/Failure, Suspicious Odor, Suspicious Package/Substance, Temperature Extremes, Tornado, Transportation Failure, Trauma, Tsunami, VIP Situation, Water Contamination, Water Disruption, Weapon.

Continuing to 418, a determination is made as to whether a computed risk vulnerability score exceeds a threshold for the particular risk category (general or specially assessed risk). As part of this determination, a total risk vulnerability score based on plural assessed risk events or categories may be generated, e.g., using the Kaiser Permanente risk assessment tool. In the case of a risk vulnerability score of a particular item(s) not exceeding a threshold(s), or a total risk vulnerability of plural items does not exceed a risk vulnerability threshold, the process will proceed to 430 in order to determine whether there are any more risk categories to evaluate at the target environment. If there are more risk categories or objects/items to evaluate for risk assessment, then the process returns to step 402 to repeat the process steps 402-418 again for other risk categories.

Returning to step 418, in the case of a risk vulnerability of a particular item exceeding a threshold, or a total risk vulnerability of plural items exceeding a risk vulnerability threshold, the process will proceed to 420 when, in response, the mobile device camera is configured to visually highlight the detected item/object subject of the risk hazard. In an embodiment, the augmented reality (AR) (or extended reality) graphics generator/system 265 at the mobile device is invoked to augment the display device's real-world view and generate an overlay of a graphic and/or data onto the current real world view at the device display in order to immediately indicate and/or visually highlight the object or item for the evaluator the existence of the determined risk hazard, e.g., a broken gas canister, or a missing fire extinguisher, by superimposing a computer-generated image on the user's view of the real world, thus providing a composite view which will indicate the potential hazard. An output audio indication (e.g. an audible signal) may be further be optionally generated in addition to the visual indication at the mobile device. Optionally, or in addition, the device may automatically initiate a haptic response such as causing the user's device to vibrate when a hazard is detected.

Figure 5A:
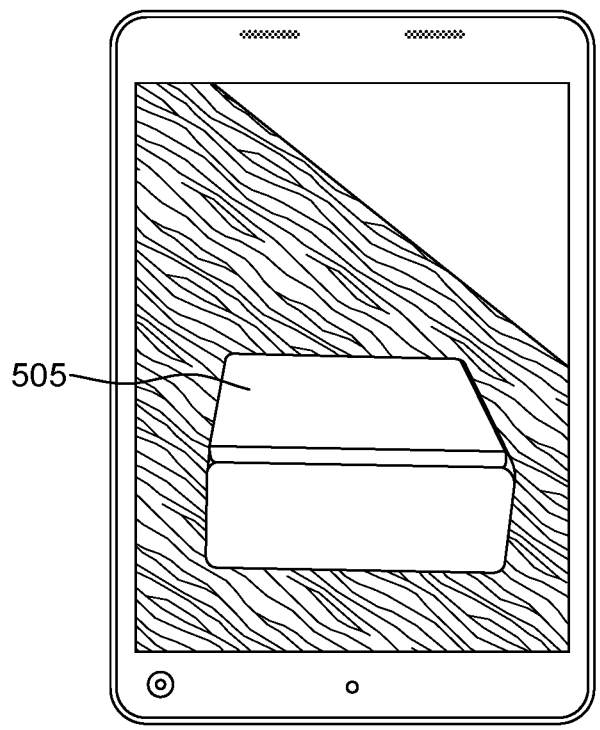
FIG. 5A shows an example mobile device showing a real-time, real-world view of a target object in a target location in which a risk vulnerability analysis is performed.
Figure 5B:
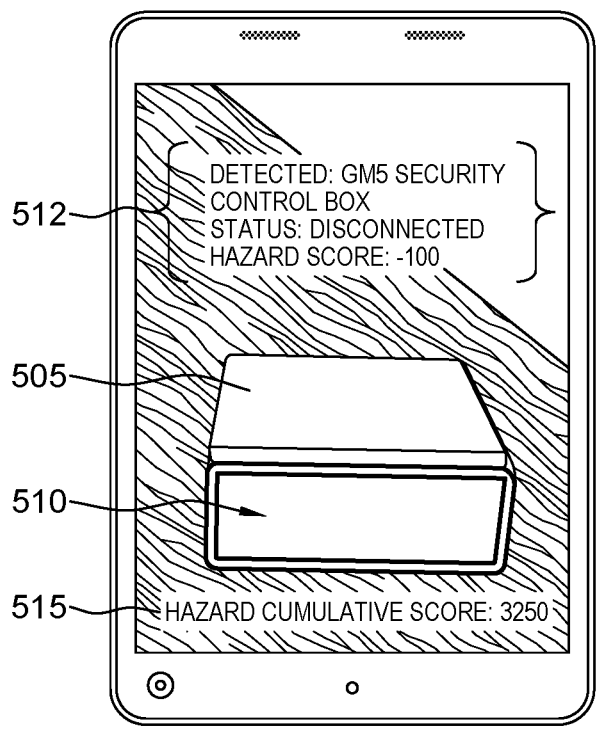
FIG. 5B depicts a graphic overlayed onto the real-world view of the target object determined using the trained model as providing a risk vulnerability, in addition to a textual overlay showing the computed risk hazard score.

FIG. 5A shows an example of a mobile device showing a real-time, real-world view 501 of a target location including a security control box 505. In an embodiment, responsive to the risk vulnerability assessments conducted using the trained model, the system determines based on the current view that the box 505 is unplugged. A risk vulnerability score is computed and the system determines that the score exceeds a risk hazard threshold. In response, as shown in the real-world view 511 of FIG. 5B, the system generates an augmented reality display feature, in the form of a graphic feature or highlight 510 shown overlayed on the box 505 determined as providing a risk hazard. Additionally generated for display is a graphic overlay 512 with text indicating the name of the device posing the risk hazard (e.g., security control box) including the actual hazard type detected, i.e., the box is unplugged or disconnected, and its individual computed hazard score. A further textual overlay 515 may be generated for the real-world view 511 showing the total or cumulative hazard score for the target location.

Alternately, or in addition, at 425, FIG. 4, the mobile device is configured, in response to detection of the risk hazard, to generate/transmit signal over a communications network 99 to immediately inform an authority/entity (e.g., police or fire department) of a current detected risk hazard determined at the current environment. Such a signal may be generated at the mobile device 200 or a remote server in communication with the device over the network to the entity in order to address the identified risk vulnerability.

Similarly, if the risk hazard evaluation is conducted at a remote server, the remote server will communicate with the mobile device in order to generate an AR overlay of the risk hazard object(s), a type of risk or classification/category for that item, a cumulative risk score of that risk hazard, and possibly an elapsed time of the risk hazard evaluation. For example, a "fire" risk category may be a risk of a "spot" fire so the evaluated risk vulnerability score is associated with that specific risk category.

As a further step, the risk vulnerability hazard result is generated/stored, e.g., through a cumulative process (e.g., in a memory) so it can be part of a cumulative record (example: cumulative vulnerability score) which may be further displayed for the user/evaluator. Alternatively, or in addition, the vulnerability result is stored for further analysis and communicated to a logging server over the network, which logging server records all data which can be re-analyzed at a later time for further insight and action.

Continuing, the method proceeds to step 430 in order to determine whether there are any more risk categories to evaluate at the target environment. If there are more risk categories or objects/items to evaluate for risk assessment, then the process returns to step 402 to repeat the process steps 402-418 again for other risk categories. However, if there are no more risk categories to evaluate, then the process proceeds to 450 in order to update the risk vulnerability model based on the most recent risk assessment. This may include storing/updated or new images of objects/items for use in evaluation for risk assessment and new correlations (e.g., matches) of those known error images (example: poorly secured canisters), data in associated data stream (example: date of last canister inspection), or data produced from other sensors on the mobile device (example: GPS radio), to risk hazards categories and associated scores.

Thus, over the time, the risk vulnerability model generated using supervised learning enables continuous learning to associate (e.g., recognize or match) certain obtained images, visual/audio patterns in associated data streams (example: USGS flood map, or real-time weather data collection), and data types formats or patterns associated with vulnerability risk analysis and learn to correlate their match to: data or known images or indicia to indicate to the user that a risk vulnerability exists, and trigger a communication of the risk vulnerability through immediate means (e.g., an augmented visual display (augmented reality) or via a haptic interface at the mobile device).

Figure 6:
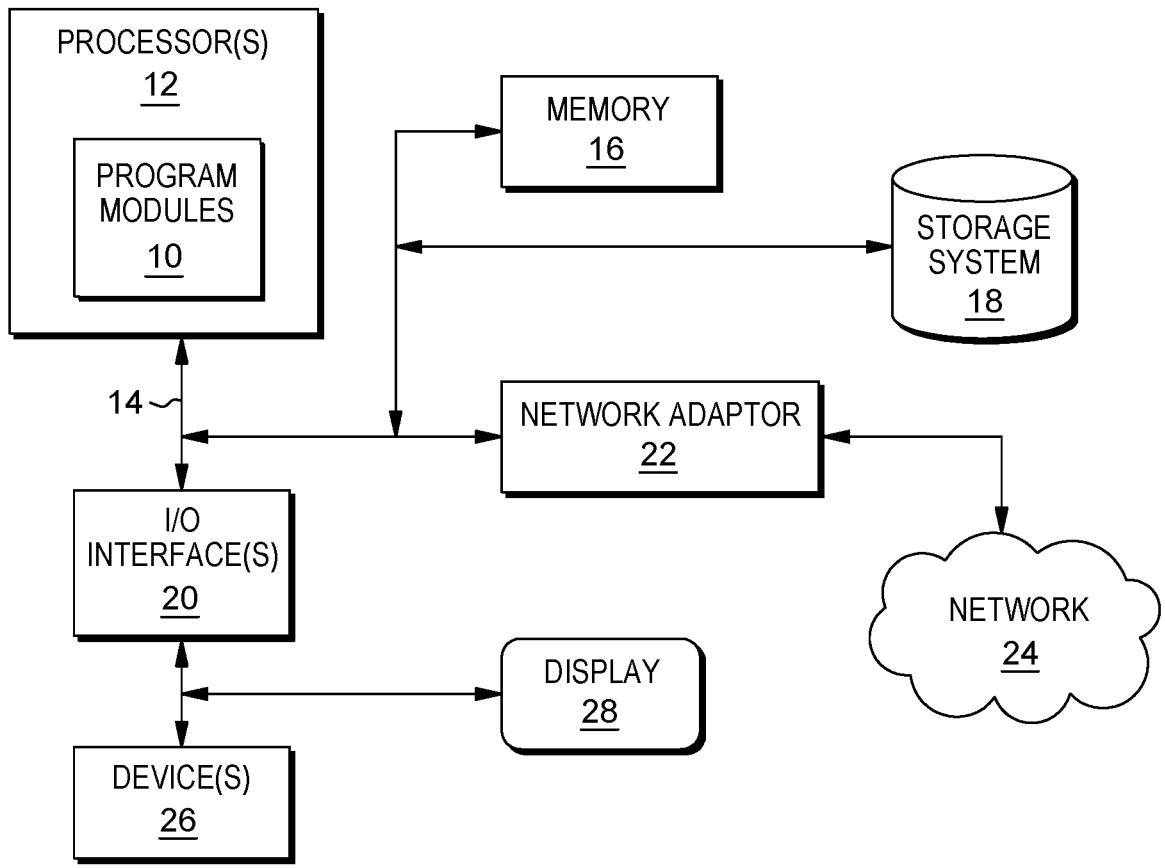
FIG. 6 depicts an exemplary system in accordance with embodiments of the present invention.

FIG. 6 illustrates an example computing system in accordance with the present invention that may provide the services and functions associated with real-time risk vulnerability assessment operations. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 1A-1B, 3 and 4.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   obtaining, using an image sensor associated with a mobile computing device, a real-world view of a target location;
   detecting, in real-time, using a processor at said mobile computing device, a target object within said real-world view;
   obtaining, in real-time, using the processor, additional context data associated with said target object, said additional context data comprising a real-time weather condition at the target location produced from one or more remotely located Internet of Things (IoT) devices and received over a wireless network connection;

obtaining an image capture of said target object;
extracting text or indicia information located on said target object directly from said image capture of said target object;
correlating said text or indicia information against relevant data that would indicate a risk vulnerability exists with respect to the target object;
detecting, using said processor, a risk hazard associated with said target object based on said additional context data and said correlated information indicating a risk vulnerability exists with respect to the target object, wherein said risk hazard detecting comprises:
running, at the processor, a model trained to recognize said target object of said target location within said real-world view display; and correlating, using said model, said recognized target object with a known risk hazard;
generating, using said processor, an indication of said risk vulnerability of said target object for display on said mobile computing device;
capturing, using the mobile computing device, a corresponding real-world audio data recording of the target location;
evaluating the captured real-world audio data;
recognizing audio patterns associated with items known to present a risk hazard;
classifying the objects/items captured in the audio data according to a risk assessment category;
generating, using said processor, a risk vulnerability indication at said mobile computing device corresponding to said risk assessment category; and
displaying, using said processor, said risk vulnerability indication on said real-world view displayed at said mobile computing device.

2. The method according to claim 1, further comprising:
communicating, using said processor, said detected risk hazard over a network to a user computing device, to apprise a user at said user computing device of said risk vulnerability.

3. The method according to claim 1, wherein said displaying said risk vulnerability indication comprises:
rendering an object, a data, or both an object and data for display on said mobile computing device as an overlay on the real-world view display.

4. The method according to claim 3, wherein to correlate said recognized target object with a known risk hazard, said model is further trained to:
compare, using a processor device, a recognized target object with one or more historical images of said target object detected as being associated with a known risk hazard.

5. The method according to claim 3, further comprising:
determining, using said processor, a risk assessment category associated with one or more target objects in said view;
computing, using said processor, a risk vulnerability score based on said context data and said associated target object;
comparing said score against a threshold corresponding to a risk hazard; and
communicating, using said processor, said target score as said risk vulnerability indication associated with said target object.

6. The method according to claim 1, further comprising:
generating, using said processor, said risk vulnerability indication as a sensation for said user via a haptic interface at said mobile computing device.

7. A system comprising:
an image sensor associated with a mobile computing device;
a memory storage device storing program instructions;
a hardware processor coupled to said memory storage device and configured to run said program instructions to perform a method to:
obtain, using the image sensor, a real-world view of a target location;
detect, in real-time, at said mobile computing device, a target object within said real-world view;
obtain, in real-time, additional context data associated with said target object, said additional context data comprising a real-time weather condition at the target location produced from one or more remotely located Internet of Things (IoT) devices and received over a wireless network connection;
obtain an image capture of said target object;
extract text or indicia information located on said target object directly from said image capture of said target object;
correlate said text or indicia information against relevant data that would indicate a risk vulnerability exists with respect to the target object;
detect a risk hazard associated with said target object based on said additional context data and said correlated information indicating a risk vulnerability exists with respect to the target objects wherein to detect a risk hazard, the hardware processor is further configured to:
run a model trained to recognize said target object of said target location within said real-world view display; and correlate, using said model, said recognized target object with a known risk hazard; generate an indication of said risk vulnerability of said target object for display on said mobile computing device; and
wherein said hardware processor is further configured to:
capture a corresponding real-world audio data recording of the target location; evaluate the captured real-world audio data; recognize audio patterns associated with items known to present a risk hazard; classify the objects/items captured in the audio data according to a risk assessment category; and generate a risk vulnerability indication at said mobile computing device corresponding to said risk assessment category;
display said risk vulnerability indication on said real-world view displayed at said mobile computing device.

8. The system according to claim 7, wherein said hardware processor is further configured to:
communicate said detected risk hazard over a network to a user computing device, to apprise a user at said user computing device of said risk vulnerability.

9. The system according to claim 8, wherein to display said risk vulnerability indication, said hardware processor is further configured to:
render an object, a data, or both an object and data, for display on said mobile computing device as an overlay on the real-world view display.

10. The system according to claim 9, wherein to correlate said recognized target object with a known risk hazard, said model is further trained to:
compare a recognized target object with one or more historical images of said target object detected as being associated with a known risk hazard.

11. The system according to claim 9, wherein said hardware processor is further configured to:
- determine a risk assessment category associated with one or more target objects in said view;
- compute a risk vulnerability score based on said context data and said associated target object;
- compare said score against a threshold corresponding to a risk hazard; and
- communicate said target score as said risk vulnerability indication associated with said target object.

12. The system according to claim 7, said hardware processor is further configured to:
- generate said risk vulnerability indication as a sensation for said user via a haptic interface at said mobile computing device.

13. A computer program product comprising a non-transitory computer-readable medium comprising instructions that, when executed by at least one processor comprising hardware, configure the at least one processor to:
- obtain, using an image sensor associated with a mobile computing device, a real-world view of a target location;
- detect, in real-time, at said mobile computing device, a target object within said real-world view;
- obtain, in real-time, additional context data associated with said target object, said additional context data comprising a real-time weather condition at the target location produced from one or more remotely located Internet of Things (IoT) devices and received over a wireless network connection;
- obtain an image capture of said target object;
- extract text or indicia information located on said target object directly from said image capture of said target object;
- correlate said text or indicia information against relevant data that would indicate a risk vulnerability exists with respect to the target object;
- detect a risk hazard associated with said target object based on said additional context data and said correlated information indicating a risk vulnerability exists with respect to the target object,
- wherein to detect said risk hazard, said instructions further configure the at least one processor to:
  - run a model trained to recognize said target object of said target location within said real-world view display; and
  - correlate, using said model, said recognized target object with a known risk hazard; generate an indication of said risk vulnerability of said target object for display on said mobile computing device;
- wherein said instructions further configure the at least one processor to: capture a corresponding real-world audio data recording of the target location; evaluate the captured real-world audio data; recognize audio patterns associated with items known to present a risk hazard; classify the objects/items captured in the audio data according to a risk assessment category; and generate a risk vulnerability indication at said mobile computing device corresponding to said risk assessment category; and
- display said risk vulnerability indication on said real-world view displayed at said mobile computing device.

14. The computer program product according to claim 13, wherein said instructions further configure the at least one processor to:
- communicate said detected risk hazard over a network to a user computing device, to apprise a user at said user computing device of said risk vulnerability.

15. The computer program product according to claim 13, wherein to display said risk vulnerability indication, said instructions further configure the at least one processor to:
- render an object, a data, or both an object and data for display on said mobile computing device as an overlay on the real-world view display.

16. The computer program product according to claim 15, wherein to correlate said recognized target object with a known risk hazard, said model is further trained to:
- compare, using a processor device, a recognized target object with one or more historical images of said target object detected as being associated with a known risk hazard.

17. The computer program product according to claim 15, wherein said instructions further configure the at least one processor to:
- determine a risk assessment category associated with one or more target objects in said view;
- compute a risk vulnerability score based on said context data and said associated target object;
- compare said score against a threshold corresponding to a risk hazard; and
- communicate said target score as said risk vulnerability indication associated with said target object.

* * * * *